United States Patent [19]

Curran et al.

[11] Patent Number: 5,032,985
[45] Date of Patent: Jul. 16, 1991

[54] MULTIPROCESSOR SYSTEM WITH MEMORY FETCH BUFFER INVOKED DURING CROSS-INTERROGATION

[75] Inventors: Brian W. Curran, Saugerties; Joseph M. D'Onofrio, Lake Katrine; Richard N. Fuqua, St. Remy; Robert D. Herzl, Lake Katrine; Louis J. Milich, New Windsor; Paul M. Moore; Joseph L. Temple, III, both of Hurley, all of N.Y.

[73] Assignee: International Business Machines Corporation, Armonk, N.Y.

[21] Appl. No.: 222,678

[22] Filed: Jul. 21, 1988

[51] Int. Cl.[5] ............................................. G06F 13/00
[52] U.S. Cl. .................... 364/200; 364/228.1; 364/228.3; 364/243.4; 364/243.41; 364/243.43; 364/243.44
[58] Field of Search ............................... 364/200, 900

[56] References Cited

U.S. PATENT DOCUMENTS

| | | | |
|---|---|---|---|
| 3,866,183 | 2/1975 | Lange | 364/200 |
| 3,896,419 | 7/1975 | Lange et al. | 364/200 |
| 4,136,386 | 1/1979 | Annunziata et al. | 364/200 |
| 4,290,103 | 9/1981 | Hattori | 364/200 |
| 4,293,910 | 10/1981 | Flusche et al. | 364/200 |
| 4,317,168 | 2/1982 | Messina et al. | 364/200 |
| 4,394,731 | 7/1983 | Flusche et al. | 364/200 |
| 4,410,946 | 10/1983 | Spencer | 364/200 |
| 4,453,216 | 6/1984 | Chiba et al. | 364/200 |
| 4,503,497 | 3/1985 | Krygowski et al. | 364/200 |
| 4,586,133 | 4/1986 | Steckler | 364/200 |
| 4,646,233 | 2/1987 | Weatherford et al. | 364/200 |
| 4,654,778 | 3/1987 | Chiesa et al. | 364/200 |
| 4,675,811 | 6/1987 | Kishi et al. | 364/200 |
| 4,851,993 | 7/1989 | Chen et al. | 364/200 |
| 4,853,846 | 8/1989 | Johnson et al. | 364/200 |
| 4,881,163 | 11/1989 | Thomas et al. | 364/200 |

FOREIGN PATENT DOCUMENTS 50-40402  4/1975  Japan .

Primary Examiner—Gareth D. Shaw
Assistant Examiner—Matthew C. Fagan
Attorney, Agent, or Firm—Robert L. Troike

[57] ABSTRACT

An improved multiprocessor system of the type including a plurality of processors and an array of memories interconnected by an interrogation logic where the processors have a store-in cache is presented. In such processors the most recent copy of the data does not always reside in the memories but can reside in a processor's cache necessitating cross-interrogation producing system delays. These delays are reduced by a fetch buffer selectively coupled to each memory for holding data before cross-interrogation and other checks are complete.

15 Claims, 7 Drawing Sheets

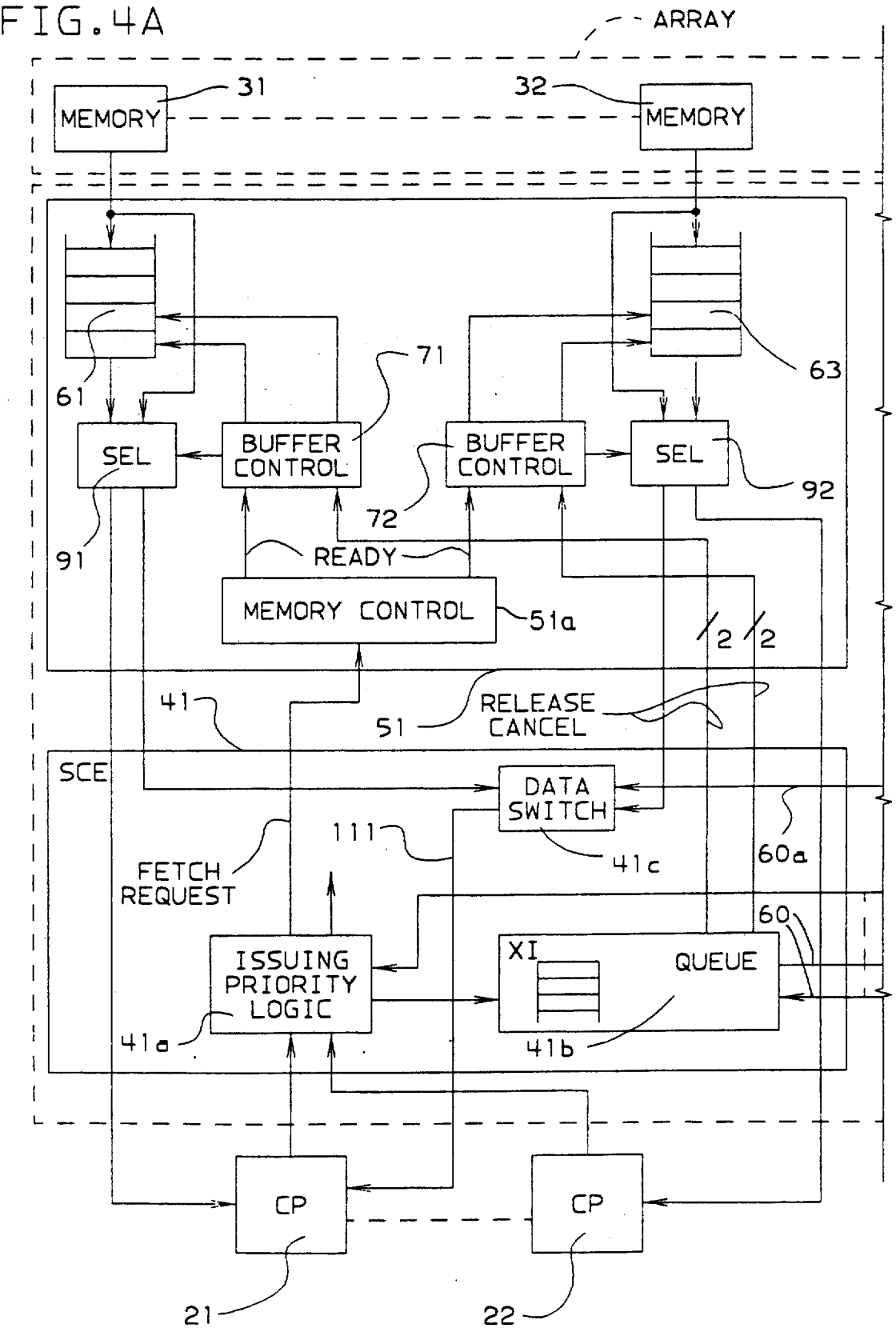

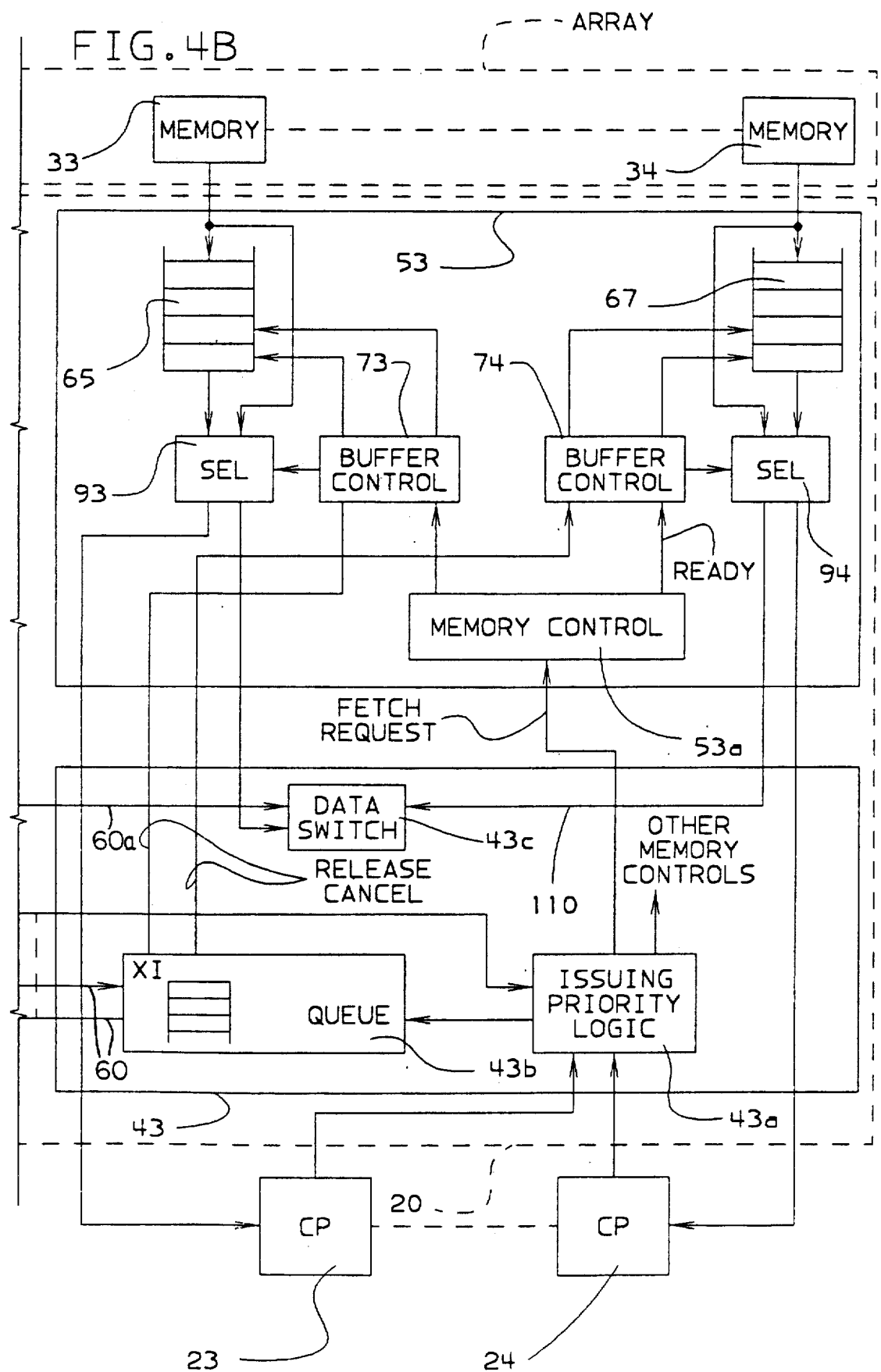

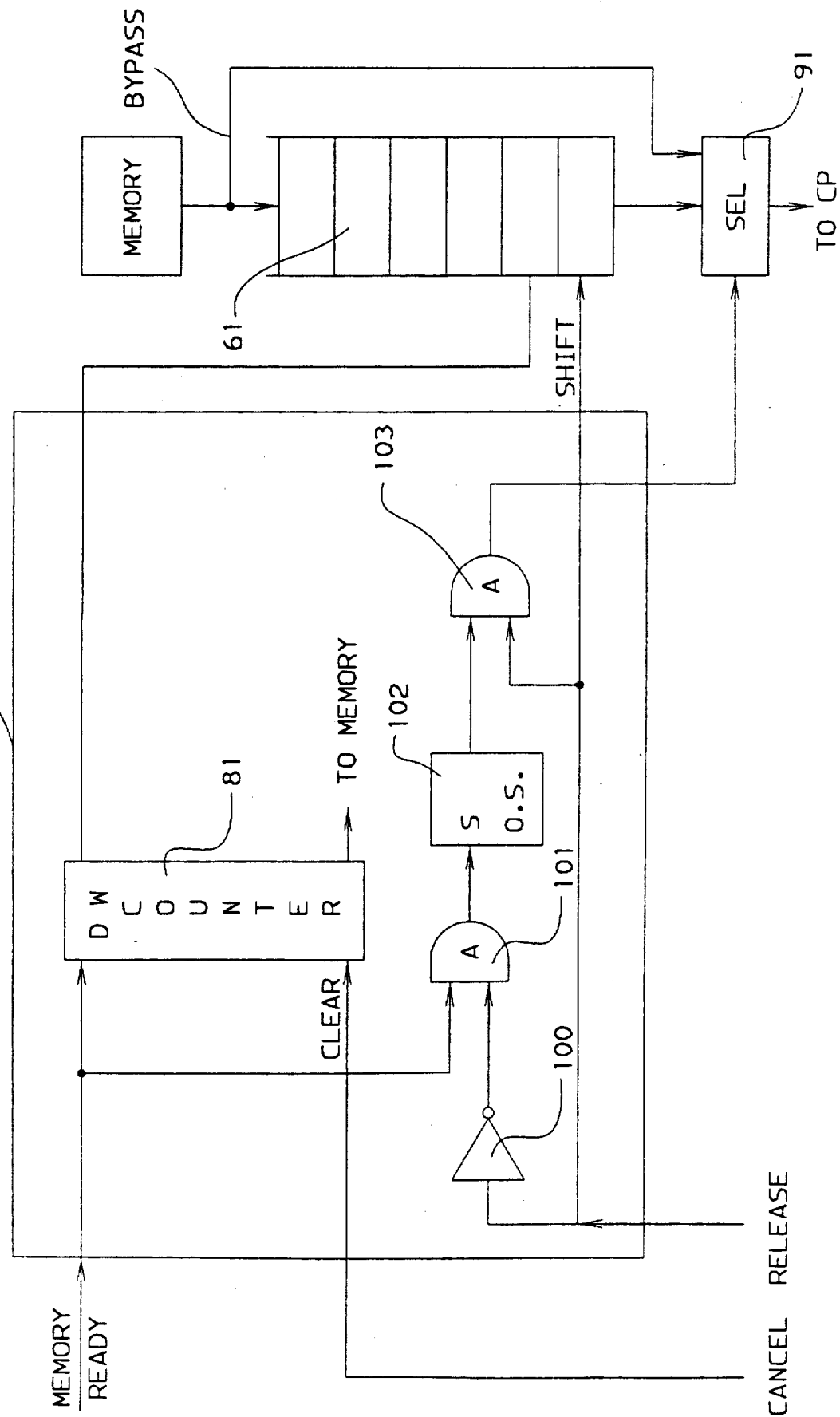

MULTIPROCESSOR SYSTEM WITH MEMORY FETCH BUFFER INVOKED DURING CROSS-INTERROGATION

FIELD OF THE INVENTION

This invention relates to multiprocessor systems where each processor has a store-in cache and each processor can access the same main storage array via interconnection logic including system controller that while a line of data is being fetched it interrogates the other processor caches to insure that the requesting processor may indeed access this line and the system control element issues a release or cancel for each fetch and more particularly to a system where if the fetch array cycle completes before interrogation is complete a special buffering mechanism is invoked.

PRIOR ART

FIG. 1 shows an organization of a prior art multiprocessor system. The system has a multiple number of independent central processors (CP) 11a through 11n and a multiple number of independent memories, 13a through 13n. The memories shown in FIG. 1 are what make up what is referred to as the main storage array 13. The central processors (CPs) 11a through 11n and memories 13a through 13n are connected by interconnection logic 15. Each independent central processor (CP) in the system has a store-in cache. A store-in cache is described for example in U.S. Pat. No. 4,136,386 of Annunziata et al. of International Business Machines Corporation, incorporated herein by reference. This is also described for example in Chiesa et al. U.S. Pat. No. 4,654,778 of International Business Machines Corporation, incorporated herein by reference. In a store-in cache design each processor contains its own buffer storage with directory and storage control and whenever such a processor fetches or stores data that is already resident in its own cache the access does not affect that which is in the distant control unit such as a system control unit or element (SCU or SCE) which normally contains a duplicate directory for each cache of the processor associated with it. When the processor tries to access data that is not already resident in its own cache the access request will be transmitted to the system control element where it will be placed on a queue for subsequent transmission to one of the memories 11a-11n of the main storage array. When the access request is transmitted to the memories of the main storage array the address of the requested data will be compared against other cache directories that are resident in the system control element to see whether the requested data is resident in the cache of another processor. If the requested data is not resident in the cache of another processor the access request will be released. If the requested data is resident in the cache of another processor, a "cross-interrogate" hit signal will be utilized to prevent data from being read from the memories of the main storage array to the cache of the requesting processor and to signal the processor which has the data in its cache to cache out the data to the memory array. The access request to the main memory arrays will be placed on a first-in first-out queue form which will again be accessed at a later time.

The system might utilize one or more system control elements each of which has two or more processors associated with the system. In such a system if each system control element contains a copy of the directories of only its associated processors the address of the requested memory of the main memory array must be transmitted to each system control element for checking against all the directories to determine whether or not the requested data is already resident within the cache of a processor.

FIG. 2 shows a system as described above where the interconnection logic includes multiple system control elements (SCE) and multiple memory controllers where a system control element and memory controller is coupled between multiple processors (CP) and a channel control element and a plurality of memories. This checking process is referred to as cross-interrogate (or XI). Since this cross-interrogate (XI) requires multiple cycles per request and can only service one request at a time, a cross-interrogate (XI) bottleneck will result during periods of high storage utilization.

To illustrate this point, FIG. 3 is a timing chart where central processor 11a through 11n request data simultaneously from memories 13a through 13n of FIG. 1 respectively. The data transfer is impaired to central processor 11b and central processor 11c due to the cross-interrogate (XI) bottleneck. The symbol "X-check done" on the figure marks the point where cross-interrogate (XI) checking is complete.

To simply restate the problem, high-speed memories cannot be fully utilized in a tightly coupled multiprocessor system due to cross-interrogate bottlenecks.

Also, storage protect keys are provided in each system control element to enable each line access request to check a storage protect key (assigned to the page frame containing the requested line of data) to determine if access request file is a security requirement before the fetch access is allowed to be sent to the main storage. U.S. Pat. No. 4,293,910 (Flusche et al.) incorporated herein by reference describes storage protect arrays provided in system control elements. Further the system control element also contains priority circuits that determine the priorities of the different type storage access request from the different processors so that access requests can be serially presented in the correct order to the main storage array. Each storage control element (SCE) includes priority controls cross-interrogate and storage protect circuits, other processors storage controls, request control buses, and data buses between main storage and connected CPUs, I/O processors, and any remote circuit control elements. All the above can cause the delay.

Also the efficiency of any processor obtaining a requested line of data change in another processor cache is improved by a cache to cache and channel-to-channel line transfers as described in U.S. Pat. No. 4,503,497, by M. A. Krygowski et al. entitled, "Independent Cache-to-Cache Transfer Means", and assigned to the same assignee as this application.

As storage hierarchies increase their number of levels and become more complex processor environments, the number of machine cycles increases for each storage request which requires accessing the a distant part of the hierarchy, for example CPU request to main storage. U.S. Pat. No. 4,654,778 provides a means for reducing this access time to distant storage hierarchy while maintaining the essential functions of the storage access by providing a fast path (comprising a control and/or data bus) directly between a storage element being accessed and the requestor in parallel with the control and data busses normally provided between the requestor and the storage element in a hierarchy which may be remote from the requestor, for example main storage.

Two-level caches are well known as exemplified in U.S. Pat. Nos. 4,290,103 of Hattori of Fujitsu and 4,675,811 of Kishi et al. of Hitachi, Ltd. In these cases in addition to the processor units containing caches with buffers and directories, the interconnection logic includes a second level cache with a second buffer storage directories and storage control which stores all of what is normally stored in the plurality of processors for quicker access between processors. While second level caches may aid somewhat in minimizing and reducing the cross-interrogate bottlenecks, it adds another level of interrogation and is used both for fetch and to store data. This two level cache is always loaded and is not associated with a given memory. A second level cache or system as described in these patents also adds extra cost to the overall system.

SUMMARY OF THE INVENTION

In accordance with one embodiment of the present invention an improved multiprocessor system comprises a multiple number of independent memories in a main array and a multiple number of processors and an interconnection logic where each of the processors has a store-in cache where the most recent copy of the data does not always reside in the main storage array and that most recent copy of data can reside in the processor's cache and whenever a processor requests data logic checking must be done to determine where the latest copy of the data resides and when checking is done a release is sent. This checking is referred to as cross-interrogate. A fetch buffer for at least one memory of said array and located in the interconnection logic is selectively coupled between the memory and the processor to hold fetch data from memory when the memory is ready and cross-interrogation and other system checks are not complete and to unload the fetch buffer to the processor when the cross-interrogation and other checks are complete and the release is sent.

BRIEF DESCRIPTION OF THE DRAWINGS

FIG. 4 is a multiprocessor system in accordance with one embodiment of the present invention.

FIG. 5 is a diagram of the buffer control in FIG. 4.

DESCRIPTION OF THE PREFERRED EMBODIMENT

Figure 1:
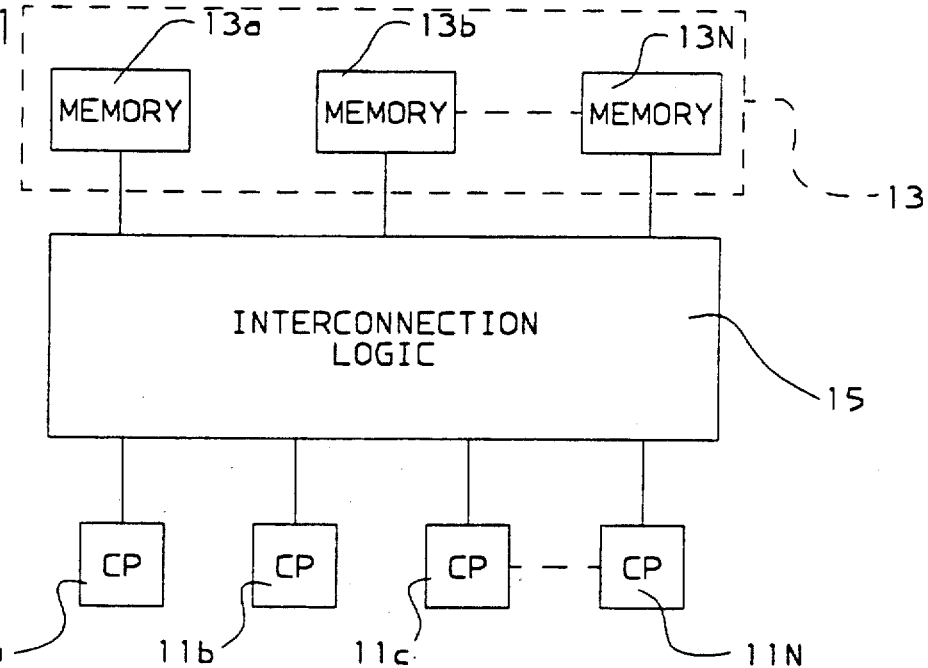
FIG. 1 is a block diagram of a tightly coupled multiprocessor in accordance with the prior art.
Figure 2:
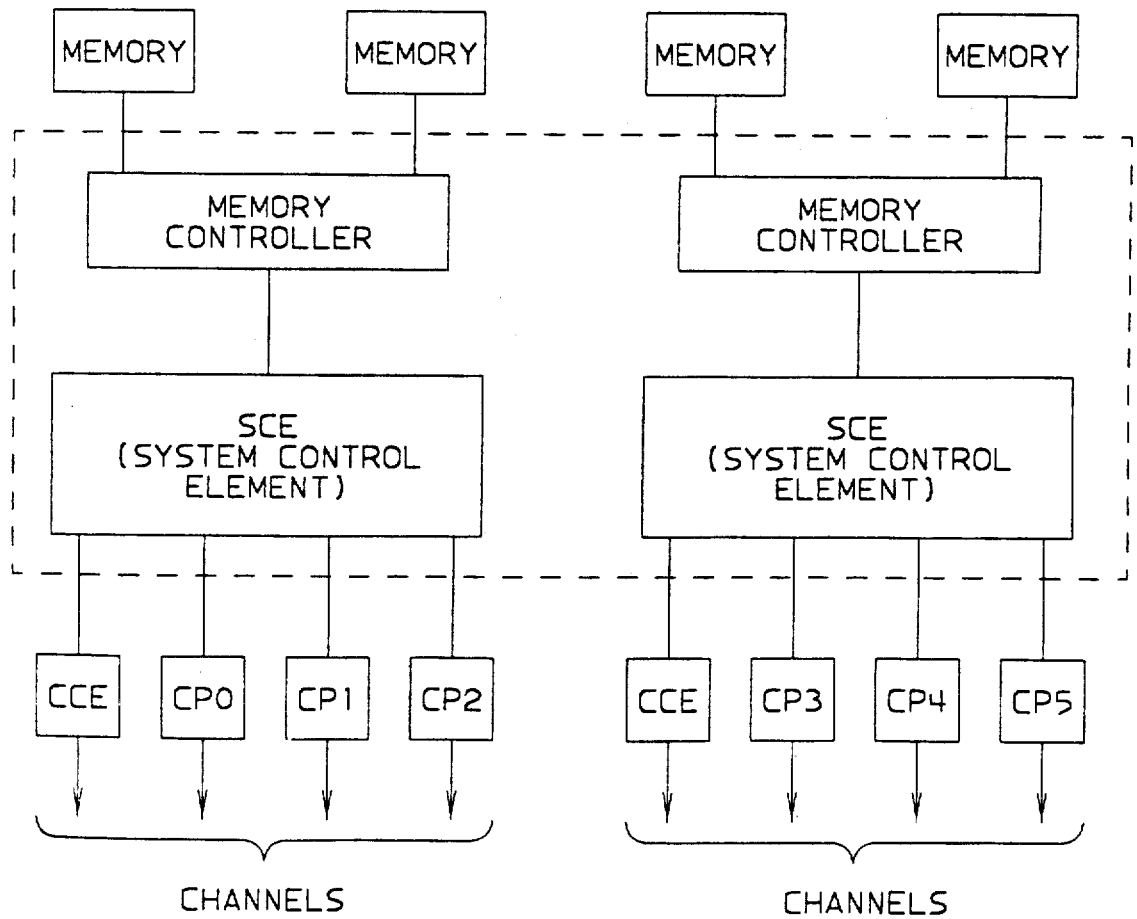
FIG. 2 is a block diagram of a multiprocessor with multiple system control elements in accordance with the prior art.
Figure 3:
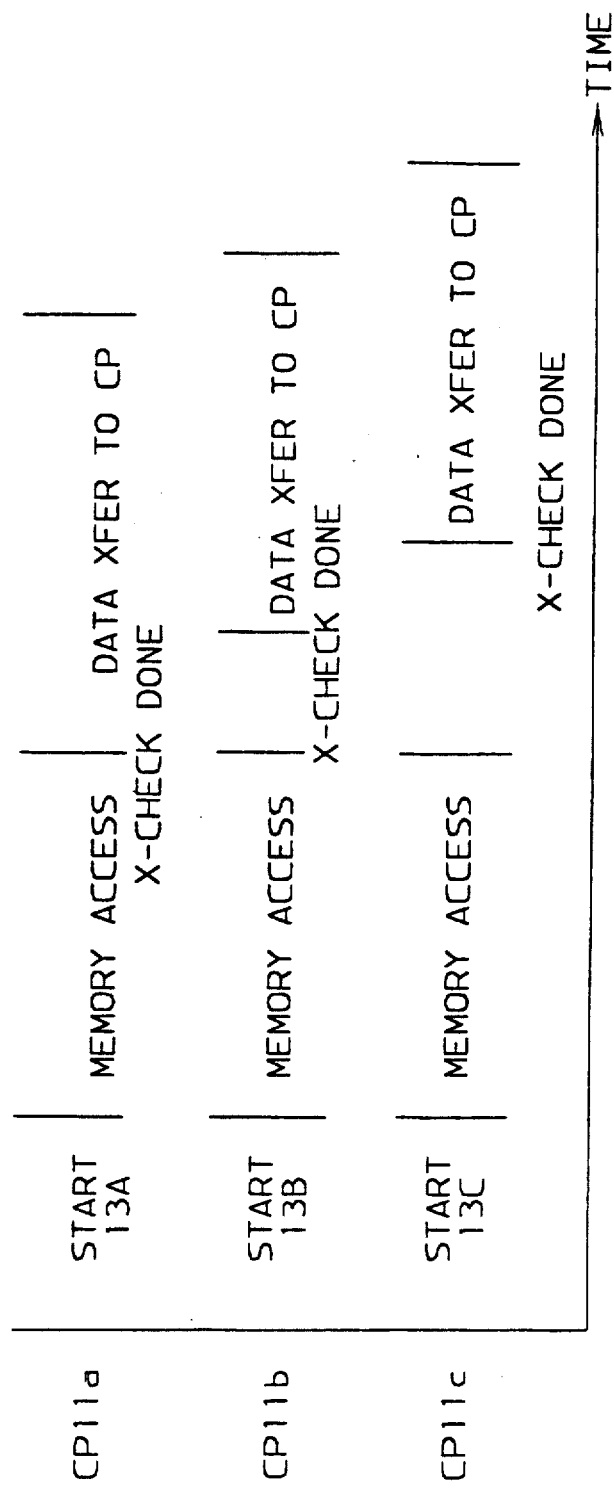
FIG. 3 is a timing diagram of the system of FIG. 1.

Referring to FIG. 4 there is illustrated a multiprocessor system in accordance with a preferred embodiment of the present invention in which there is represented a plurality of central processors 21 through 24. Each of these processors includes its own private buffer storage and storage control and directory forming a store-in cache for that central processor. For more details see previously cited U.S. Pat. No. 4,136,386 incorporated herein by reference. The system includes interconnection logic 20 and a plurality of memories 31 through 34 (main storage array). The interconnection logic 20 may include for example two system control elements (SCE) 41 and 43 and memory controllers (MC) 51 and 53. Each of the system control elements 41 and 43 include cross-interrogate circuits 41b, 43b and issuing/priority logic circuits 41a, 43a. The issuing/priority logic circuits 41a and 43a includes storage protection key circuits as well as priority control. In response to any fetch request from the processors 21 through 23 fetch requests are produced out of the system control element from the logic circuits 41a and 43a to the memory control in the memory controllers 51 and 53 and to the cross interrogate logic circuits 41b and 43b to start cross-interrogation. Between the system control elements (SCE) 41 and 43 there are the buses 60 between cross-interrogation circuits 41b and 43b, request buses 60, data buses 60 for handling the communication requests and data buses 60 between the two SCEs. Data switches 41c and 43c control the data flow through the SCE. Main memories 31, 32, 33 and 34 for example may be addressed by any CP, such as CPs 21-24 via the data switches. The memory controller 51 provide local control for example for memories 31 and 32. For purposes of illustration the output from memory 31 is shown as being coupled to the processor 21 and the output from memory 32 is coupled to the processor 22, the output from memory 33 is coupled to processor 23 and the output from memory 34 is coupled to processor 24. However these memories and processors are interconnected by address bus lines so any processor can be addressed to any memory and vice versa. For example memory 34 output can be passed to processor 21 via bus 110, data switch 43c, bus 60a, data switch 41c and bus 110. This can be via the fast path per U.S. Pat. No. 4,654,778.

The memory controller 51, 53 comprises a memory control circuit 51a, 53a which in response to the fetch request from the issuing/priority logic 41a or issuing/priority logic 43a provides a "memory ready" signal to corresponding buffer control 71, 72, 73 or 74. The memory control circuit counts the number of machine cycles known to access storage after fetch and provides the ready signal. In accordance with the present invention the memory controller 51 includes fetch buffers 61, 63 and memory controller 53 includes a fetch buffers 65 and 67. Fetch buffers 61, 63, 65 and 67 are coupled to and buffer the output from memories 31, 32, 33 and 34 respectively. Cross-interrogate circuits 41b and 43b produce a release or cancel signal to buffer control circuits 71 through 74. A release signal is produced when the cross-interrogation verification that the main memory has the most current copy in the system and the requesting processor may indeed access the data as per the fetch request from the issuing priority logic. The buffer control logic in response to a "memory ready" signal from the memory control circuit loads the fetch buffer and after release signal will begin transferring data out of the buffer 61, 63, 65, and 67. A fetch request signal produces the memory ready signal to cause in the buffer control a counter to begin counting and loading data into the fetch buffer. For the example of a memory with a depth buffer of 1, a single cache line is loaded into the buffer 61. When release signal is released before the memory ready the buffers 61, 63, 65 and 67 are bypassed via gates 91–94.

Referring to FIG. 5 there is illustrated a diagram of a buffer control 71 which shows a double word counter 81. The output of the counter clocks the buffer sequentially to load the fetch buffer from the memory. This cancel is via a separate line from logics 41b or 43b. If the cross-interrogate issues a cancel, this cancel clears the double word counter and no output is provided from storage. If the output from the cross-interrogate circuit is a release signal from the SCE, this is used to shift data out of the fetch buffer. Also if there is a release following memory ready input signal this condition produces a select signal at the select gate 91 to output the data in the fetch buffer and apply the output from the fetch buffers to the central processors. This condition may be detected for example in the buffer control 71 by inverter 100, AND gate 101, one-shot latch 102 and AND gate 103. Only when a release occurs after a memory ready is AND gate 103 enabled to gate select gate 91 to the position to shift data out of the fetch buffer. This is the only condition in which gate 91 is in position so the output is coupled from the fetch buffer. Select gates 92 through 94 operate in the same manner. If the output from the cross-interrogate is a cancel, this clears the double word counter 81. When the double word counter is cleared, the contents of the buffer are unused and are overlayed during the next fetch request. Unless the "memory ready" signal is on to start the counter nothing is clocked into the buffer. If release signal occurs on or before the memory ready, the memory data bypasses the fetch buffer.

The buffer is used on fetches (that is data coming out of the memory and going to a central processor (CP or channel CCE)). Each buffer has a defined depth. A depth of 1 (n=1) means the buffer can hold one memory transfer, up to one cache line. A depth of 2 (n=2) means the buffer can holdup to two cache lines.

In the operation of the system with a depth less than one cache line the fetch buffer holds only the portion of the cache line that can be transferred during cross-interrogation for example a cache line is 16 double words and a word is 72 bits long. The fetch buffer is three registers each holding one double word. In this case D=3/16. When release occurs after the "memory ready" the data from registers are sequentially shifted out and when the counter 81 counts the three double words (buffer is empty) outputs a control signal to select gate 91 to thereafter bypass the fetch buffer.

Figure 6:
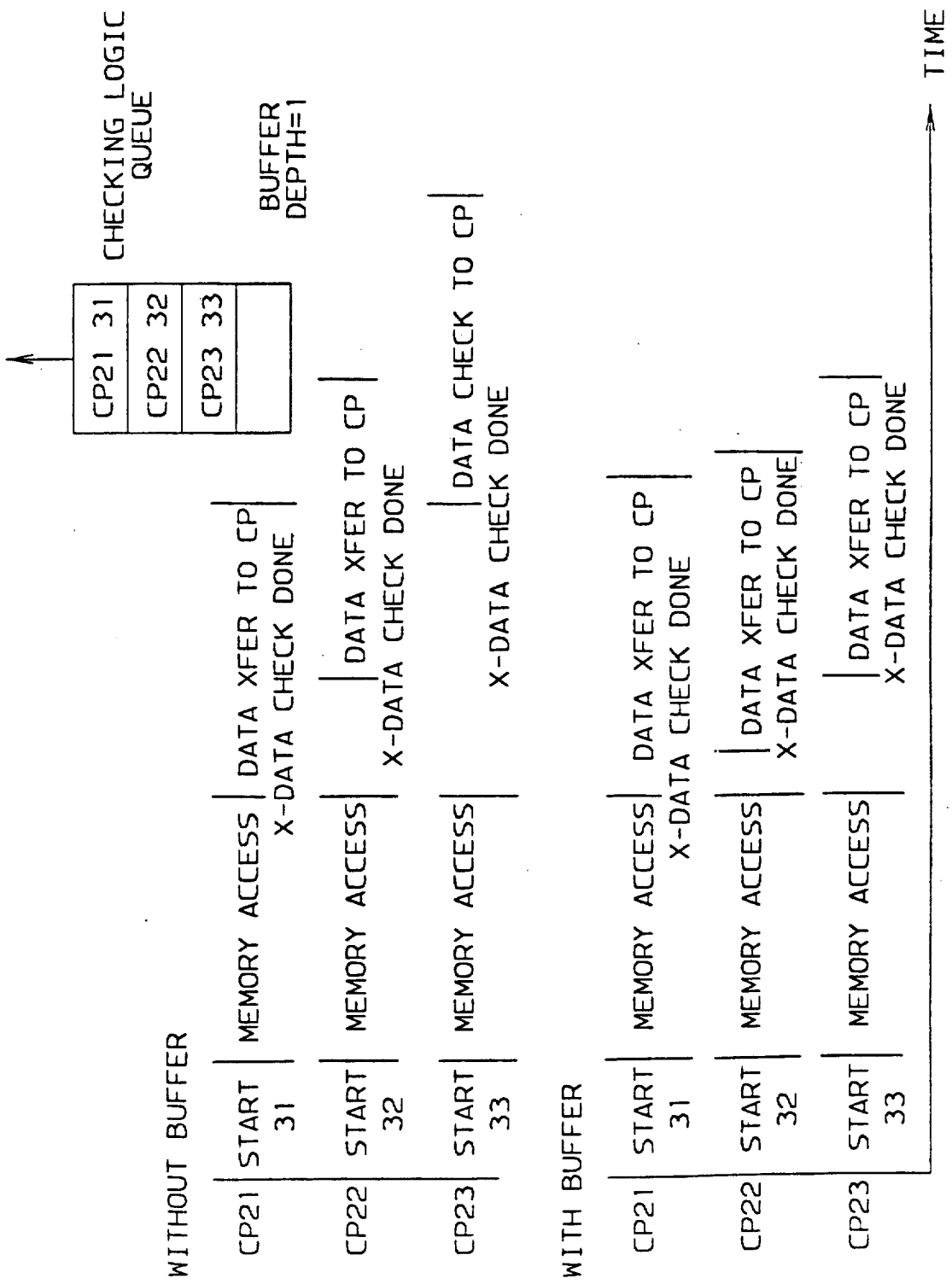
FIG. 6 is a timing diagram representing an example of the operation of the system of FIG. 4 without a fetch buffer and with fetch buffers of the depth of 1 and three central processors (CPs) fetching from different memories.

FIG. 6 shows an example of a fetch buffer with a depth of one cache line and three central processors (CPs) fetching from different memories with and without the fetch buffers. In both cases (with and without the fetch buffer) the first processor (CP21) receives data at the same time. This is due to the fact that the CP21 is the first request into cross-interrogate (XI). With the fetch buffer, CP22 and CP23 receives data sooner than without the buffer. This is due to the fact that the data is now being held in the interconnection logic instead of the memory cards of the main storage. Hence the latency from the cross-interrogation (XI) due to data transfer is reduced. Another point which is not illustrated in the figures is that the memory will be available to handle another request sooner, since data was transferred out of the memory sooner.

Figure 7:
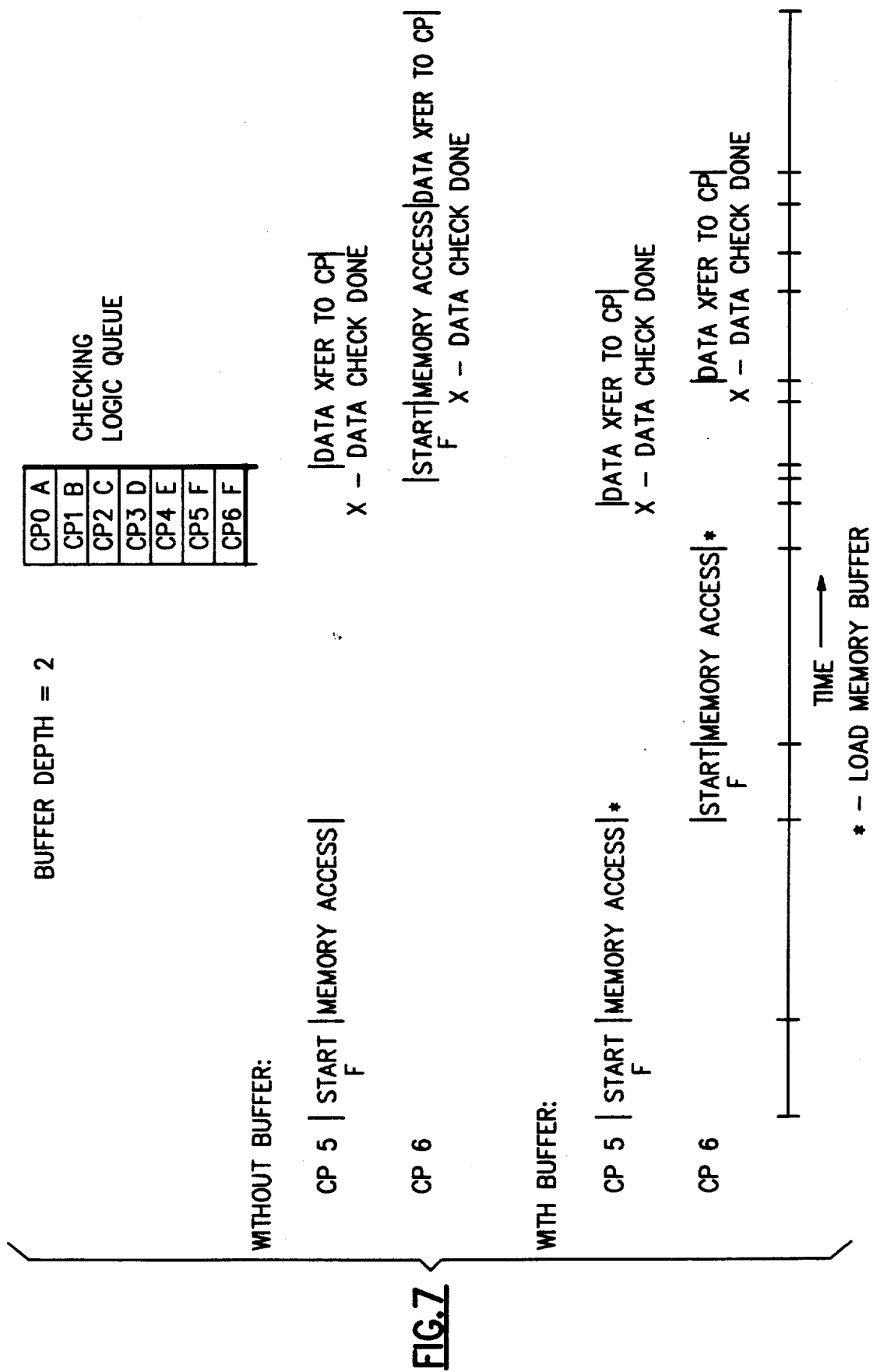
FIG. 7 is a timing diagram showing an example with a buffer depth of 2 and second central processors (CPs) fetching.

According to FIG. 7 a fetch buffer shows timing improvement with a buffer depth of 2 and seven central processors (CPs) fetching. Central processors CP5 and CP6 are both fetching from a given memory. In this example the cross-interrogation is backed up with respect to requests (see checking logic queue). Without the fetch buffer the central processor CP6 cannot start memory F until cross-interrogate checking is complete for central processor CP5's request. This leaves a large gap in time where the memory is sitting idle. With the fetch buffer, CP6's request can be initiated as soon as CP5's request is done with the memory (but still waiting for cross-interrogate). Hence fully utilizing the memory in a tightly coupled multiprocessor system.

The present system speeds up the transfer of data to the requesting processor because the data is moved closer to the requestor and additional memory requests may be started sooner.

What is claimed is:

1. A multiprocessor system comprising in combination:

an array of independent memories for storing data;
a plurality of processors each having a store-in cache;
an interconnection logic means coupled between said array of memories and said plurality of processors for interconnecting said memories to said processors, said system not always having a most recent copy of data in the array of memories but the most recent copy can reside only in a processor's cache, said interconnection logic means includes cross-interrogate checking means responsive to a request by a given processor for the data from a given memory of said array of memories for cross-interrogate checking to determine where in the store-in caches and the array of memories the most recent copy of the data resides and for, when said checking is complete and the given memory has the most recent copy, providing a release signal,
said interconnection logic means including a fetch buffer and selective fetch buffer coupling means, said interconnection logic passing the data from the given memory to said fetch buffer even if cross-interrogate checking is not complete, said selective fetch buffer coupling means only coupling said fetch buffer between said given memory of said array of memories and said given processor for holding the data fetched from said given memory in response to said given processor's request when the data is available from said given memory before said release signal is provided and for otherwise coupling the data fetched at said given memory to said given processor without passing through said fetch buffer;
and means coupled to said fetch buffer and responsive to said release signal for unloading the data from the fetch buffer to said given processor when said cross-interrogation checking and other checks are complete and said release signal is provided.

2. The multiprocessor system of claim 1 wherein the fetch buffer holds up to one cache line.

3. The multiprocessor system of claim 1 wherein said fetch buffer holds up to two cache lines.

4. The multiprocessor system of claims 1 wherein said fetch buffer holds only a portion of a cache line.

5. The multiprocessor system of claim 1 wherein said fetch buffer holds only a portion of a cache line that can be transferred during cross-interrogation and other system checks.

6. A multiprocessor system comprising:

an array of independent memories for storing data;
a plurality of processors each having a store-in cache;

an interconnection logic means coupled between said array of memories and said plurality of processors for interconnecting said memories to said processors, said system not always having a most recent copy of data in the array of memories but the most recent copy can reside only in a processor's cache, said interconnection logic means including cross-interrogate checking means responsive to a request by a given processor for the data from a given memory of said array of memories for cross-interrogate checking to determine where in the store-in caches and said array of memories the most recent copy of the data resides and, when said checking is complete and the given memory has the most recent copy, providing a release signal;

said interconnection logic means further providing, in response to the given processor's request, a memory ready signal a given time period after the request for data by the given processor, said given time period equal to that time period it takes after the request for data by the given processor for the data to be made available at said given memory;

said interconnection logic further including a fetch buffer associated with said given memory and fetch buffer coupling means coupled to said fetch buffer and responsive to the providing of said memory ready signal before the providing of said release signal for coupling said fetch buffer between said given memory and said given processor and responsive to said release signal on or before the providing of said memory ready signal for coupling said given memory directly to said given processor without coupling through said fetch buffer, and said fetch buffer responsive to said given processor's request for holding the data from said given memory when coupled to said given memory and responsive to said release signal for unloading said data in said fetch buffer to the requesting given processor.

7. The multiprocessor system of claim 6 wherein said fetch buffer holds up to one cache line.

8. The multiprocessor system of claim 6 wherein said fetch buffer holds up to two cache lines.

9. The multiprocessor system of claim 6 wherein said fetch buffer holds only a portion of a cache line.

10. The multiprocessor system of claim 6 wherein said fetch buffer holds only a portion of a cache line that can be transferred during cross-interrogation and other system checks.

11. A multiprocessor system comprising:
an array of independent memories for storing data;
a plurality of processors each having a store-in cache;
an interconnection logic means coupled between said array memories and said plurality of processors for interconnecting said memories to said processors, said system not always having a most recent copy of data in the array of memories but the most recent copy can reside int he processor's cache, said interconnection logic means includes cross-interrogate checking means responsive to a request by a given processor for the data from a given memory of said array of memories for cross-interrogate checking to determine where in the store-in caches and said array of memories the most recent copy of the data resides and, when checking is complete and the given memory has the most recent copy, providing a release signal, said interconnection logic means further providing a memory ready signal a predetermined given number of system machine cycles after the request for data by the given processor, said predetermined given number of machine cycles being that number of cycles that it takes to make the data available at said given memory, said interconnection logic further including a separate fetch buffer associated with each memory of said independent memories, and coupling means responsive to the providing of said memory ready signal before the providing of said release signal for coupling the fetch buffer associated with given memory between said given memory and said given processor and responsive to the providing of said release signal on or before the providing of said memory ready signal for coupling said given memory directly to said given processor without coupling through said associated fetch buffer, and said associated fetch buffer responsive to said processor's given request for holding the data from said given memory and responsive to said release signal for unloading the data in said fetch buffer to the given processor.

12. The multiprocessor system of claim 11 wherein said fetch buffer holds up to one cache line.

13. The multiprocessor system of claim 11 wherein said fetch buffer holds up to two cache lines.

14. The multiprocessor system of claim 11 wherein said fetch buffer holds only a portion of a cache line.

15. The multiprocessor system of claim 11 wherein said fetch buffer holds only a portion of a cache line that can be transferred during cross-interrogation and other system checks.

* * * * *